US012652666B2

(12) United States Patent　(10) Patent No.:　US 12,652,666 B2
Lee et al.　(45) Date of Patent:　Jun. 9, 2026

(54) METHOD AND APPARATUS PERFORMING UPLINK TRANSMISSION AND RECEPTION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 18/548,319

(22) PCT Filed: Jan. 9, 2023

(86) PCT No.: PCT/KR2023/000354
§ 371 (c)(1),
(2) Date: Aug. 29, 2023

(87) PCT Pub. No.: WO2023/132714
PCT Pub. Date: Jul. 13, 2023

(65) Prior Publication Data
US 2024/0137934 A1　Apr. 25, 2024
US 2024/0236984 A9　Jul. 11, 2024

Related U.S. Application Data

(60) Provisional application No. 63/298,208, filed on Jan. 10, 2022.

(51) Int. Cl.
*H04W 72/1273*　(2023.01)
*H04L 1/1812*　(2023.01)
(Continued)

(52) U.S. Cl.
CPC ....... *H04W 72/1273* (2013.01); *H04L 1/1812* (2013.01); *H04W 72/21* (2023.01); *H04W 72/231* (2023.01)

(58) Field of Classification Search
CPC ....... H04L 1/18; H04L 1/1812; H04L 1/1854; H04L 1/1861; H04L 5/00; H04W 4/06;
(Continued)

(56) References Cited

U.S. PATENT DOCUMENTS 11,956,697 B2 *　4/2024　Takeda .................. H04L 1/1896
2018/0103356 A1 *　4/2018　Wang .................... H04W 76/40
(Continued)

OTHER PUBLICATIONS

PCT International Application No. PCT/KR2023/000354, International Search Report dated Apr. 18, 2023, 3 pages.
(Continued)

*Primary Examiner* — Awet Haile
(74) *Attorney, Agent, or Firm* — LEE, HONG, DEGERMAN, KANG & WAIMEY

(57) ABSTRACT

Disclosed are a method and apparatus for performing uplink transmission in a wireless communication system. The method by which a terminal performs uplink transmission, according to an embodiment of the present disclosure, comprises the steps of: receiving, from a base station, configuration information related to at least one serving cell; receiving a unicast physical downlink shared channel (PDSCH) or a multicast PDSCH from the base station in a first serving cell of a secondary physical uplink control channel (PUCCH) group from among the at least one serving cell; and transmitting, to the base station, hybrid automatic repeat request (HARQ)-acknowledgement (ACK) information regarding the unicast PD SCH or the first multicast PDSCH, wherein on the basis that the multicast PDSCH is received from the base station in the first serving cell, the HARQ-ACK information may be transmitted to the
(Continued)

RECEIVING, FROM A BASE STATION, CONFIGURATION INFORMATION RELATED TO AT LEAST ONE SERVING CELL ～ S710

RECEIVING, FROM THE BASE STATION, A UNICAST PDSCH OR MULTICAST PDSCH IN A FIRST SERVING CELL OF A SECONDARY PHYSICAL UPLINK CONTROL INFORMATION GROUP AMONG THE AT LEAST ONE SERVING CELL ～ S720

TRANSMITTING, TO THE BASE STATION, A PUCCH INCLUDING HARQ-ACK INFORMATION FOR THE UNICAST PDSCH OR THE MULTICAST PDSCH ～ S730 base station by using a PUCCH resource of a second serving cell of a primary PUCCH group from among the at least one serving cell.

9 Claims, 11 Drawing Sheets

(51) Int. Cl.
    *H04W 72/21*          (2023.01)
    *H04W 72/231*      (2023.01)

(58) Field of Classification Search
    CPC ............. H04W 72/1273; H04W 72/21; H04W 72/231; H04W 8/24
    See application file for complete search history.

(56) References Cited

U.S. PATENT DOCUMENTS

| | | | |
|---|---|---|---|
| 2021/0051727 | A1 | 2/2021 | Lei et al. |
| 2022/0053522 | A1* | 2/2022 | MolavianJazi ... H04W 72/0453 |
| 2022/0124767 | A1* | 4/2022 | Fu .......................... H04W 72/23 |
| 2024/0089704 | A1* | 3/2024 | Shrivastava ...... H04W 72/0453 |
| 2024/0260023 | A1* | 8/2024 | Park ...................... H04W 72/51 |

OTHER PUBLICATIONS

Samsung, "Introduction of Multicast-broadcast services in NR," R1-2112933, 3GPP TSG RAN WG1 #107-e, e-Meeting, Nov. 2021, 45 pages.

Vivo, "Remaining issues on mechanisms to improve reliability for RRC_Connected UEs," R1-2111040, 3GPP TSG RAN WG1 #107-e, e-Meeting, Nov. 2021, 8 pages.

Xiaomi, "Discussion on mechanisms to improve reliability for RRC_Connected UEs," R1-2111550, 3GPP TSG RAN WG1 #107-e, e-Meeting, Nov. 2021, 6 pages.

Moderator (CMCC), "Summary#3 on mechanisms to support group scheduling for RRC_Connected UEs for NR MBS," R1-2112541, 3GPP TSG RAN WG1 #107-e, e-Meeting, Nov. 2021, 146 pages.

European Patent Office Application Serial No. 23737462.4, Search Report dated Oct. 8, 2025, 7 pages.

Moderator (CMCC), "Summary#4 on mechanisms to support group scheduling for RRC_Connected UEs for NR MBS," R1-2112542, 3GPP TSG RAN WG1 #107-e, e-Meeting, Nov. 2021, 156 pages.

* cited by examiner

FIG.7

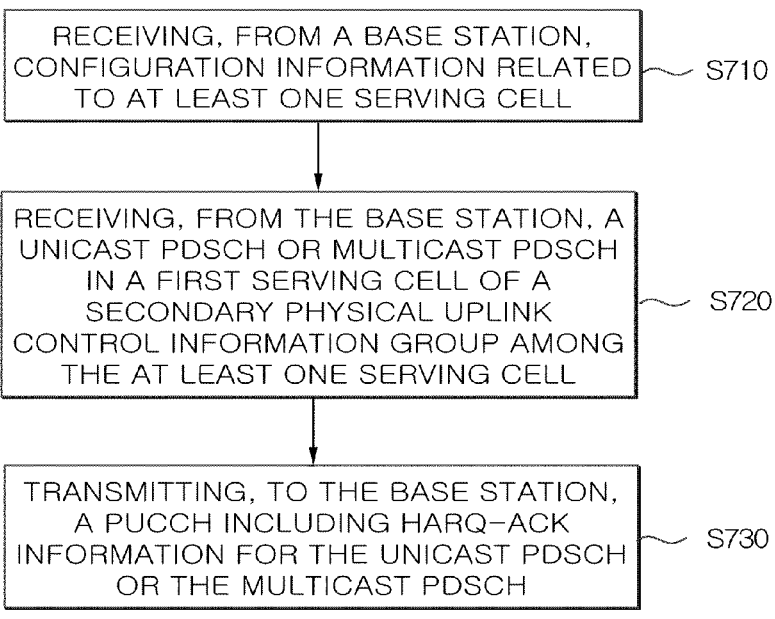

RECEIVING, FROM A BASE STATION, CONFIGURATION INFORMATION RELATED TO AT LEAST ONE SERVING CELL — S710

RECEIVING, FROM THE BASE STATION, A UNICAST PDSCH OR MULTICAST PDSCH IN A FIRST SERVING CELL OF A SECONDARY PHYSICAL UPLINK CONTROL INFORMATION GROUP AMONG THE AT LEAST ONE SERVING CELL — S720

TRANSMITTING, TO THE BASE STATION, A PUCCH INCLUDING HARQ−ACK INFORMATION FOR THE UNICAST PDSCH OR THE MULTICAST PDSCH — S730

FIG.8

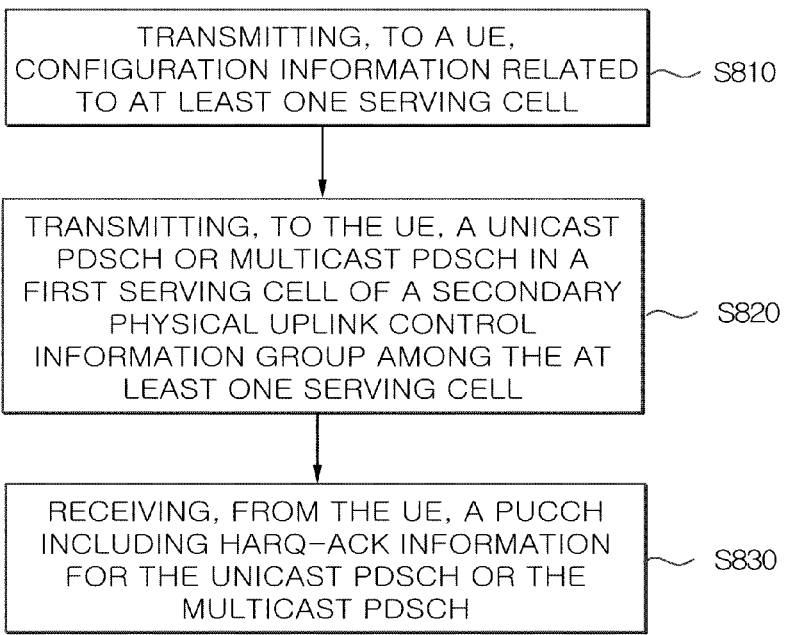

TRANSMITTING, TO A UE, CONFIGURATION INFORMATION RELATED TO AT LEAST ONE SERVING CELL — S810

TRANSMITTING, TO THE UE, A UNICAST PDSCH OR MULTICAST PDSCH IN A FIRST SERVING CELL OF A SECONDARY PHYSICAL UPLINK CONTROL INFORMATION GROUP AMONG THE AT LEAST ONE SERVING CELL — S820

RECEIVING, FROM THE UE, A PUCCH INCLUDING HARQ−ACK INFORMATION FOR THE UNICAST PDSCH OR THE MULTICAST PDSCH — S830

METHOD AND APPARATUS PERFORMING UPLINK TRANSMISSION AND RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2023/000354, filed on Jan. 9, 2023, which claims the benefit of U.S. Provisional Application No. 63/298,208, filed on Jan. 10, 2022, the contents of which are all hereby incorporated by reference herein in their entireties.

TECHNICAL FIELD

The present disclosure relates to a wireless communication system, and in more detail, relates to an uplink transmission/reception method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide an uplink transmission/reception method and apparatus in a wireless communication system.

In addition, an additional technical problem of the present disclosure is to provide a method and apparatus for transmitting and receiving multicast HARQ-ACK through the same cell in a carrier aggregation (CA) environment.

The technical problems to be achieved by the present disclosure are not limited to the above-described technical objects, and other technical problems which are not described herein will be clearly understood by those skilled in the pertinent art from the following description.

According to an embodiment of the present disclosure, a method for performing uplink transmission by a user equipment (UE) in a wireless communication system may include receiving, from a base station, configuration information related to at least one serving cell; receiving, from the base station, a unicast physical downlink shared channel (PDSCH) or multicast PDSCH in a first serving cell of a secondary physical uplink control information group among the at least one serving cell; and transmitting, to the base station, a PUCCH including hybrid automatic repeat request (HARQ)-acknowledgment (ACK) information for the unicast PDSCH or the multicast PDSCH, and based on the multicast PDSCH being received from the base station in the first serving cell, the HARQ-ACK information may be transmitted to the base station using a PUCCH resource of a second serving cell of a primary PUCCH group among the at least one serving cell.

A method for performing uplink reception by a base station in a wireless communication system may include transmitting, to a user equipment (UE), configuration information related to at least one serving cell; transmitting, to the UE, a unicast physical downlink shared channel (PDSCH) or multicast PDSCH in a first serving cell of a secondary physical uplink control information group among the at least one serving cell; and receiving, from the UE, a PUCCH including hybrid automatic repeat request (HARQ)-acknowledgment (ACK) information for the unicast PDSCH or the multicast PDSCH, and based on the multicast PDSCH being transmitted to the UE in the first serving cell, the HARQ-ACK information may be received from the UE using a PUCCH resource of a second serving cell of a primary PUCCH group among the at least one serving cell.

According to an embodiment of the present disclosure, an uplink transmission/reception method and apparatus may be provided in a wireless communication system.

In addition, as an embodiment of the present disclosure, a plurality of terminals can save uplink resources by transmitting multicast HARQ-ACK through the same cell in a CA environment.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 7 is a diagram for describing an uplink transmission method of a terminal according to an embodiment of the present disclosure.

FIG. 8 is a diagram for describing an uplink reception method of a base station according to an embodiment of the present disclosure.

DETAILED DESCRIPTION

Figure 1:
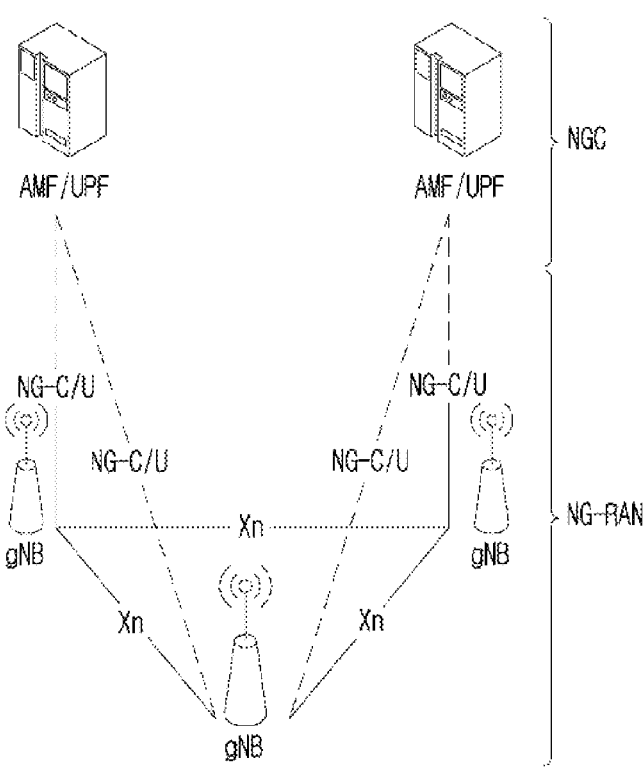
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
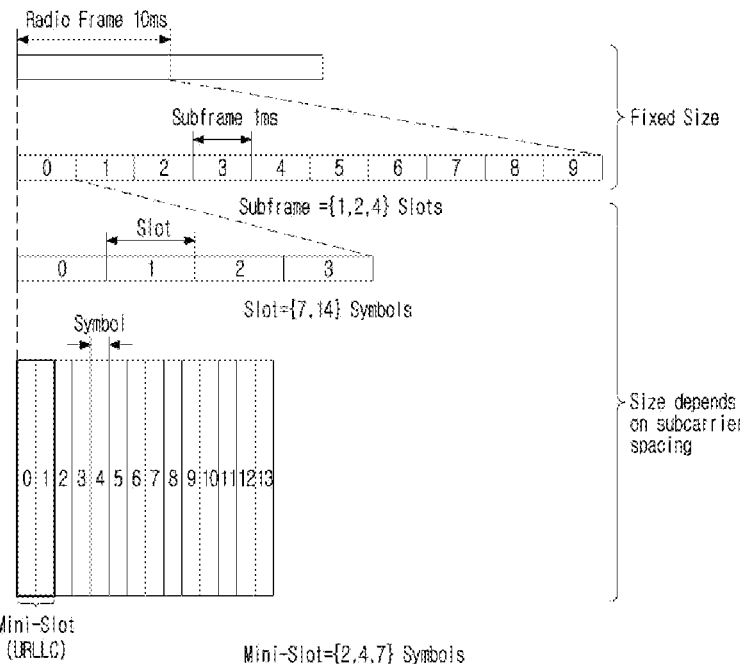
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [KHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot $(N_{symb}^{slot})$, the number of slots per radio frame $(N_{slot}^{frame,\mu})$ and the number of slots per subframe $(N_{slot}^{subframe,\mu})$ in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
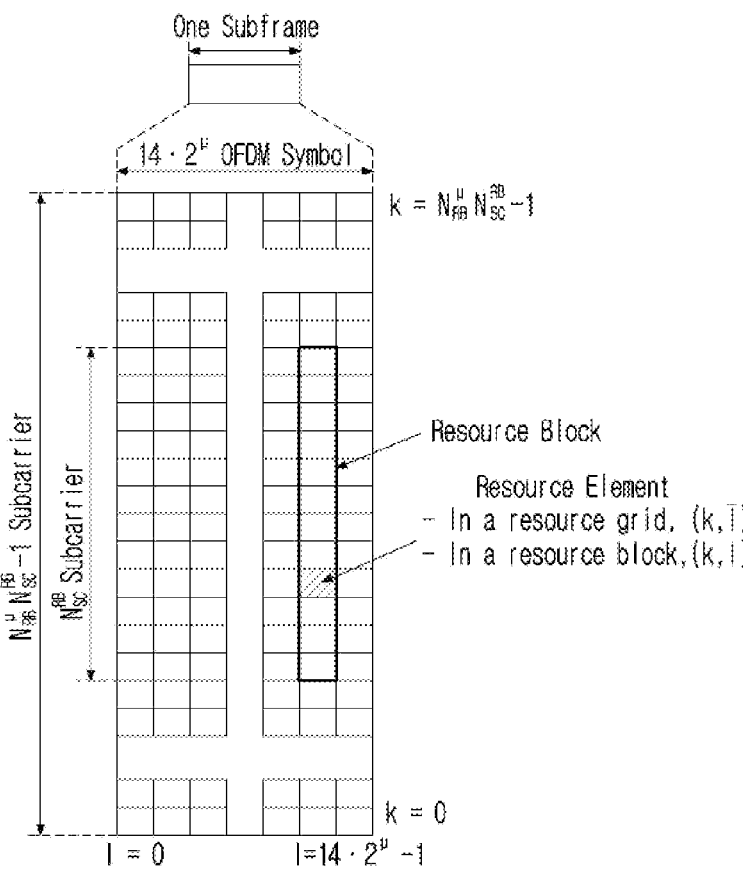
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \qquad \text{[Equation 2]}$$

$N_{BWP,i}^{start,\mu}$ is a common resource block that a BWP starts relatively to common resource block 0.

Figure 4:
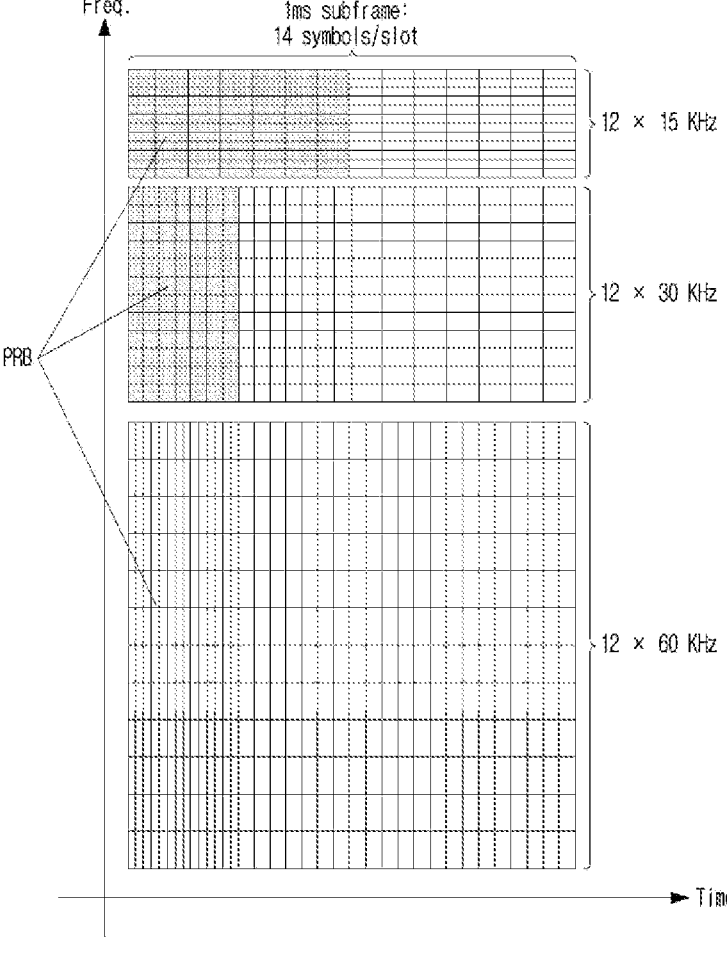
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
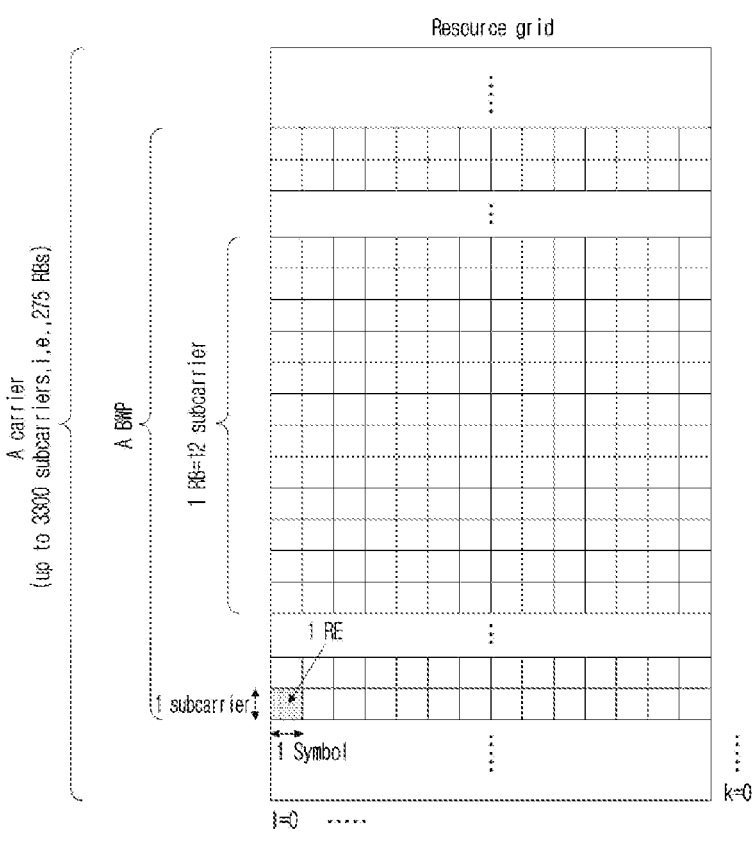
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP by L1 signaling or MAC CE or RRC signaling, etc.).

Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
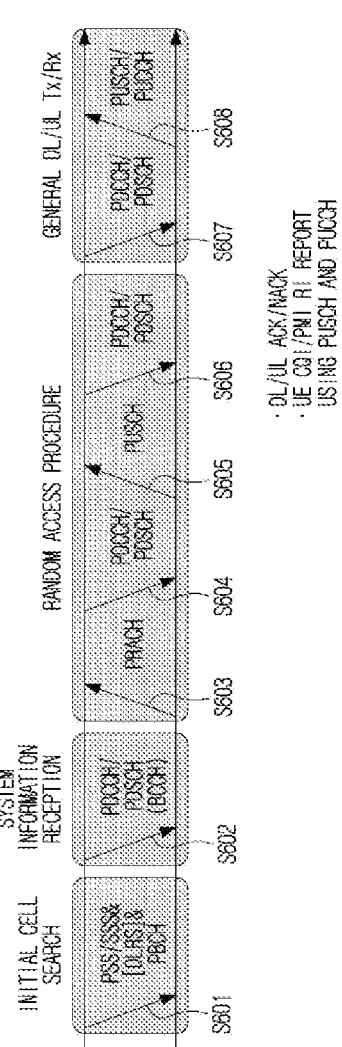
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast/Multicast Service) Scheme

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

Here, SFN scheme may be used to provide a broadcast service to a wide area (e.g., MBMS area) through resources allocated semi-statically in advance, and SC-PTM scheme may be mainly used to provide a broadcast service only within a cell coverage through dynamic resources.

SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting SC-MCCH or SC-MTCH data may be scheduled through a PDCCH indicated by a Group Radio Network Temporary Identifier (G-RNTI).

In this case, a temporary mobile group identify (TMGI) corresponding to the service ID may be mapped one-to-one with a specific G (group)-RNTI value. Accordingly, when the base station provides a plurality of services, a plurality of G-RNTI values may be allocated for SC-PTM transmission. One or a plurality of terminals may perform PDCCH monitoring by using a specific G-RNTI to receive a specific service. Here, G-RNTI means a UE group identifier that receives MBS.

And, for a specific service/specific G-RNTI, SC-PTM dedicated DRX on-duration section may be configured, and in this case, the UEs may wake up only for a specific on-duration period and perform PDCCH monitoring for the G-RNTI.

MBS (Multicast Broadcast Service) Based Transmission/Reception Operation

A common MBS frequency resource is a contiguous subset of common resource blocks within a bandwidth portion. The starting position $N_{MBS,i}^{start,\mu}$ of the common MBS frequency resource i may be defined based on point A, and the size of the common MBS frequency resource may be given as $N_{MBS,i}^{size,\mu}$. Resource blocks of the common MBS frequency resource may be numbered in the same way as resource blocks in which $N_{BWP,i}^{start,\mu}$ and $N_{BWP,i}^{size,\mu}$ are replaced by $N_{MBS,i}^{start,\mu}$ and $N_{MBS,i}^{size,\mu}$, respectively.

The UE may not expect to receive a PDSCH or PDCCH related to MBS transmission scheduled with G (group)-RNTI, G (group)-CS (configured scheduling)-RNTI, or MCCH (multicast control channel)-RNTI outside common MBS frequency resources.

For MBS scheduling, DCI format 4_0, DCI format 4_1, and DCI format 4_2 may be used.

For example, DCI format 4_0 may be used for scheduling a PDSCH for broadcast in a DL cell. Through DCI format 4_0 with CRC scrambled by G-RNTI or MCCH-RNTI configured by 'MBS-SessionInfo', a frequency/time domain resource allocation field, VRB-to-PRB mapping field, MCS field, RV (redundancy version) field, MCCH change notification field, and padding bits may be transmitted. 0 may be added to DCI format 4_0 until the payload size becomes equal to the size of DCI format 1_0 monitored in the common search space of the same serving cell.

As another example, DCI format 4_1 may be used for PDSCH scheduling for multicast in a DL cell. Through DCI format 4_1 with CRC scrambled by G-RNTI configured by 'G-RNTI-Config' or 'G-CS-RNTI', frequency/time domain resource allocation field, VRB-to-PRB mapping field, MCS field, RV field, new data indicator field, HARQ process number field, a DL allocation index field, a PUCCH resource indicator field, a PDSCH-to-HARQ feedback time indicator field, and padding bits may be transmitted.

As another example, DCI format 4_2 may be used for PDSCH scheduling in a DL cell. Through DCI format 4_2 with CRC scrambled by G-RNTI configured by 'G-RNTI-Config' or 'G-CS-RNTI', a frequency/time domain resource allocation field, a VRB-to-PRB mapping field, a PRB bundling size indicator field, rate matching indicator field, HARQ process number field, DL allocation index field, PUCCH resource indicator field, PDSCH-to-HARQ feedback time indicator field, an antenna port field, a TCI field, a DMRS sequence initialization field, a priority indicator field, and an HARQ-ACK feedback activation/deactivation indication field may be transmitted.

In describing the present disclosure, a DCI format with a CRC scrambled by C-RNTI, CS-RNTI, or MCS-C-RNTI is referred to as a unicast DCI format. And, a DCI format with a CRC scrambled by G-RNTI or G-CS-RNTI is referred to as a multicast DCI format.

The unicast DCI format may be DCI format 0_0/0_1/0_2/1_0/1_1/1_2, and the multicast DCI format may be DCI format 4_1/4_2. PDSCH reception scheduled by the unicast or multicast DCI format may be referred to as unicast or multicast PDSCH reception, and HARQ-ACK information related to a unicast or multicast DCI format may also be referred to as unicast or multicast HARQ-ACK information.

And, a DL common frequency resource (CFR) (for MBS) may provide group common PDCCH and group common PDSCH transmission resources for MBS transmission and reception. UL CFR may provide HARQ-ACK PUCCH resources for group common PDSCH reception.

One CFR can be one MBS specific BWP or one UE specific BWP. Alternatively, one or more CFRs may be configured within one UE-specific BWP. One CFR may be associated with one UE-specific BWP.

In a basic wireless communication system, a base station may configure UE-specific SPS (semi-persistent scheduling) configuration information to a specific UE, so that repeated downlink (DL) SPS transmission resources may be allocated to the specific UE according to the configured period. At this time, the DCI transmitted through the UE-dedicated PDCCH indicates activation of a specific SPS configuration index (SPS activation), so that the corresponding UE may be indicated to repeatedly receive the SPS transmission resource according to the configured period.

Such SPS transmission resources may be used for initial HARQ transmission, and the base station may allocate retransmission resources of a specific SPS configuration index through DCI transmitted through a terminal-dedicated PDCCH. For example, when the UE reports a HARQ NACK (negative acknowledgment) for the SPS transmission resource, the base station may allocate the retransmission resource to the DCI so that the UE can receive DL retransmission.

The DCI transmitted through the UE-dedicated PDCCH may indicate deactivation (SPS release or SPS deactivation) of a specific SPS configuration index. In this case, the corresponding UE may not receive the indicated SPS transmission resource. At this time, the CRC of the DCI for the activation/retransmission/deactivation may be scrambled with CS-RNTI (Configured Scheduling RNTI).

In a wireless communication system (e.g., NR), a DL broadcast or DL multicast transmission scheme for supporting MBS similar to the above-described MBMS may be applied. A base station may provide a point-to-multipoint (PTM) transmission scheme and a point-to-point (PTP) transmission scheme for DL broadcast or DL multicast transmission.

In the PTM transmission method for MBS, a base station may transmit a group common PDCCH and a group common PDSCH to a plurality of UEs, and the plurality of UEs may simultaneously receive the same group common PDCCH and group common PDSCH transmission to decode the same MBS data.

And, in the PTP transmission scheme for MBS, a base station may transmit a UE-dedicated PDCCH and a UE-dedicated PDSCH to a specific UE, and only the corresponding UE may receive the UE-dedicated PDCCH and the UE-dedicated PDSCH. At this time, when there are a plurality of terminals receiving the same MBS service, the base station may separately transmit the same MBS data to individual terminals through different terminal-dedicated PDCCHs and terminal-dedicated PDSCHs.

In the PTM transmission scheme, a base station may transmit a plurality of group common PDSCHs to a plurality of UEs. The base station may receive an HARQ-ACK for a group common PDSCH based on a PUCCH resource dedicated to the UE from the UE. At this time, when the TB for the PDSCH common to the group is successfully decoded, the UE may transmit ACK as HARQ-ACK information to the base station. If the TB for the unicast PDSCH is not successfully decoded, the UE may transmit NACK as HARQ-ACK information to the base station.

This HARQ-ACK transmission scheme is referred to as an ACK/NACK-based HARQ-ACK transmission scheme, and the UE may transmit ACK/NACK-based HARQ-ACK to the base station using UE-dedicated PUCCH resources. On the other hand, when a NACK-only based HARQ-ACK scheme is configured for a group common PDSCH, the UE may perform PUCCH transmission only in the case of NACK without PUCCH transmission in the case of ACK. At this time, the PUCCH may transmit only NACK as HARQ-ACK information using a group common PUCCH resource.

In the case of a basic wireless communication system, in a carrier aggregation (CA) environment, a base station may configure a serving cell as a scheduling cell or a scheduled cell. For example, DCI transmitted to a scheduling cell may schedule PDSCH transmission of a scheduled cell. In this case, a user-specific search space (USS) may be configured in the scheduling cell, and the USS may not be configured in the scheduled cell. In this case, it may not be clear whether scheduling for multicast transmission is possible in a cell scheduled for unicast.

Therefore, in the present disclosure, when CA or DC (Dual Connectivity) is configured, a CFR deactivation method for a multicast PDSCH in a deactivated SCell (Secondary Cell) and a HARQ-ACK feedback method for this will be described.

FIG. 7 is a diagram for describing a communication performance operation of a terminal in a wireless communication system to which the present disclosure may be applied.

The UE may receive configuration information related to at least one serving cell from the base station (S710).

For example, the UE may receive configuration information related to the PCell and one or more SCells (e.g., 'CellGroupConfig', or/and 'ServingCellConfig', etc.) from the base station. That is, a CA (carrier aggregation) environment may be configured by configuration information received from the base station. At least one serving cell configured for the UE may be configured as a scheduled cell or/and a scheduling cell.

When CA is configured, the UE may configure a primary PUCCH group and/or a secondary PUCCH group by the base station. For example, the PCell may be included in the primary PUCCH group, but the PCell may not be included in the secondary PUCCH group.

The UE may receive a unicast PDSCH or a multicast PDSCH from the base station in the first serving cell of the secondary PUCCH group among at least one serving cell (S720). Here, the first serving cell may include the SCell of the secondary group.

The UE may transmit capability information related to whether or not multicast PDSCH may be received in the first serving cell to the base station before step S710 or/and step S720. The base station may determine whether to transmit the multicast PDSCH to the first serving cell based on the capability information received from the UE.

The UE may transmit a PUCCH including HARQ-ACK information for the unicast PDSCH or multicast PDSCH received from the base station to the base station (S730).

Here, the HARQ-ACK information may include ACK/NACK-based HARQ-ACK information or/and NACK-only based HARQ-ACK information. And, the first serving cell may be the SCell of the secondary PUCCH group, and the second serving cell may be the PCell of the primary PUCCH group.

For example, based on a multicast PDSCH being received from a base station in a first serving cell, HARQ-ACK information for the multicast PDSCH may be transmitted to the base station using PUCCH resources of a second serving cell of a primary PUCCH group among at least one serving cell.

That is, when a multicast PDSCH is received in a specific SCell of the secondary group, the UE may transmit a PUCCH including HARQ-ACK information for the multicast PDSCH to the base station using PUCCH resources of the PCell (of the primary group).

According to the above-described method, even when CA is configured, a plurality of UEs may transmit multicast HARQ-ACK through the same cell (or/and PUCCH resources of the same cell), and thus uplink resources can be saved.

As another example of the present disclosure, based on a unicast PDSCH being received from a base station in a first serving cell, HARQ-ACK information for the multicast PDSCH may be transmitted to the base station using PUCCH resources of the first serving cell.

As another example, based on a unicast PDSCH or a multicast PDSCH being received from a base station in the second serving cell, HARQ-ACK information for the PDSCH may be transmitted to the base station using PUCCH resources of the second serving cell.

As another example of the present disclosure, based on the inactivation of the first serving cell, a common frequency resource (CFR) associated with the first serving cell may be deactivated.

For example, based on receiving the RRC message, MAC-CE, or/and DCI for deactivating the first serving cell, the UE may deactivate the first serving cell and deactivate the CFR associated with the first serving cell.

As another example of the present disclosure, (regardless of deactivation of the first serving cell), the CFR associated with the first serving cell may be deactivated by an RRC message, MCCH (multicast control channel) message, MAC-CE, or DCI received from the base station.

Here, the DCI may include information indicating at least one of an index of a CFR associated with the first serving cell, an index or CIF (carrier indicator field) value of the first serving cell, or an index of a bandwidth part (BWP) associated with the CFR. The UE may deactivate the corresponding CFR according to the above-described information included in the DCI.

FIG. 8 is a diagram for describing an operation of a base station performing communication in a wireless communication system to which the present disclosure may be applied.

The base station may transmit configuration information related to at least one serving cell to the terminal (S810). When CA is configured as a plurality of serving cells are configured, the base station may configure a primary PUCCH group and a secondary PUCCH group for the UE.

The base station may transmit a unicast PDSCH or a multicast PDSCH to the terminal in the first serving cell of the secondary PUCCH group among at least one serving cell (S820).

Here, the base station may receive capability information related to whether the first serving cell (e.g., SCell) may receive the multicast PDSCH from the UE. The base station may transmit a multicast PDSCH to the first serving cell based on the capability information received from the terminal.

The base station may receive the PUCCH including HARQ-ACK information for the unicast PDSCH or the multicast PDSCH from the terminal (S830). Since the description related to S830 corresponds to the description related to S730, duplicate descriptions will be omitted.

Hereinafter, when CA or DC is configured, a CFR deactivation method and/or a HARQ-ACK feedback method for multicast PDSCH will be described in detail.

Embodiment 1

Embodiment 1 relates to a transmission and reception operation based on a common frequency resource (CFR) configured for a UE.

Figure 9:
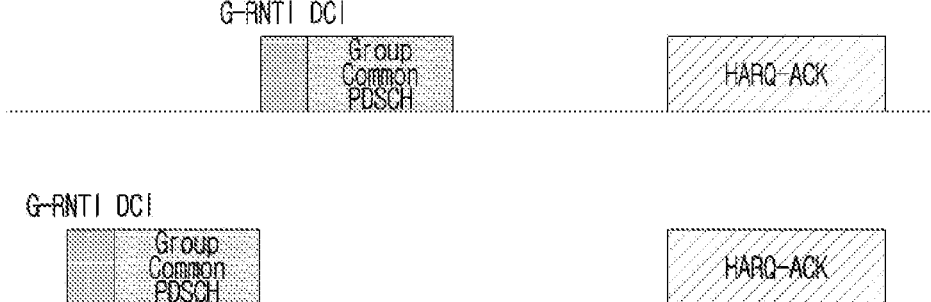
FIG. 9 illustrates a method of transmitting and receiving HARQ-ACK for a group common PDSCH in a wireless communication system to which the present disclosure may be applied.

As shown in FIG. 9, a UE may receive group common PDCCHs/PDSCHs scheduled by different G-RNTIs through FDM or TDM. Here, the group UE may perform multicast HARQ-ACK transmission for common PDCCH/PDSCH. As shown in FIG. 9, in a basic wireless communication system, a group common DCI may schedule a group common PDSCH in the same cell.

The base station may transmit configuration information related to PDSCH for BWP (hereinafter, PDSCH-config for BWP) and PDSCH for CFR (hereinafter, PDSCH-config for CFR) to the UE.

At this time, the CFR may be associated with the UE active BWP. Some parameters may be configured in common for CFR and BWP. Therefore, the base station may not include some parameters in both PDSCH-config for CFR and PDSCH-config for BWP, but may include them in only one PDSCH-config.

For example, if the configuration value for parameter A may be equally included in PDSCH-config for CFR and PDSCH-config for BWP, the base station may include parameter A only in PDSCH-config for BWP (or only in PDSCH-config for CFR).

Hereinafter, when CA for unicast is configured, a multicast PDCCH/PDSCH transmission/reception method will be described.

Embodiment 1-1

In a scheduled cell of CA, CFR may not be configured and multicast PDCCH/PDSCH transmission may not be supported.

At this time, SS/CORESET for multicast cannot be configured in the scheduled cell. The UE may ignore SS/CORESET configuration for multicast in the scheduled cell, consider invalid configuration, or determine that SS/CORESET configuration in the scheduled cell is not for multicast.

In this case, CFR may be configured only in the scheduling cell of CA or multicast PDCCH/PDSCH transmission may be supported.

Embodiment 1-2

CFR may be configured in CA's scheduled cell and group common transmission may be supported.

As an example of the present disclosure (Example 1-2-1), PDCCH-config and PDSCH-config used for multicast transmission may be configured in the CFR of a scheduled cell. At this time, SS/CORESET for multicast may be configured in the scheduled cell.

Here, intra-carrier scheduling of unicast transmission may not be supported in CA's scheduled cell. However, when PDCCH-config for multicast and PDSCH-config for multicast are configured for a scheduled cell, the UE may perform intra-carrier scheduling as an exception for UE common transmission.

As another example of the present disclosure (Example 1-2-2), PDSCH-config used for multicast transmission may be configured in the CFR of the scheduled cell, but PDSCH-config used for multicast transmission may not be configured.

Figure 10:
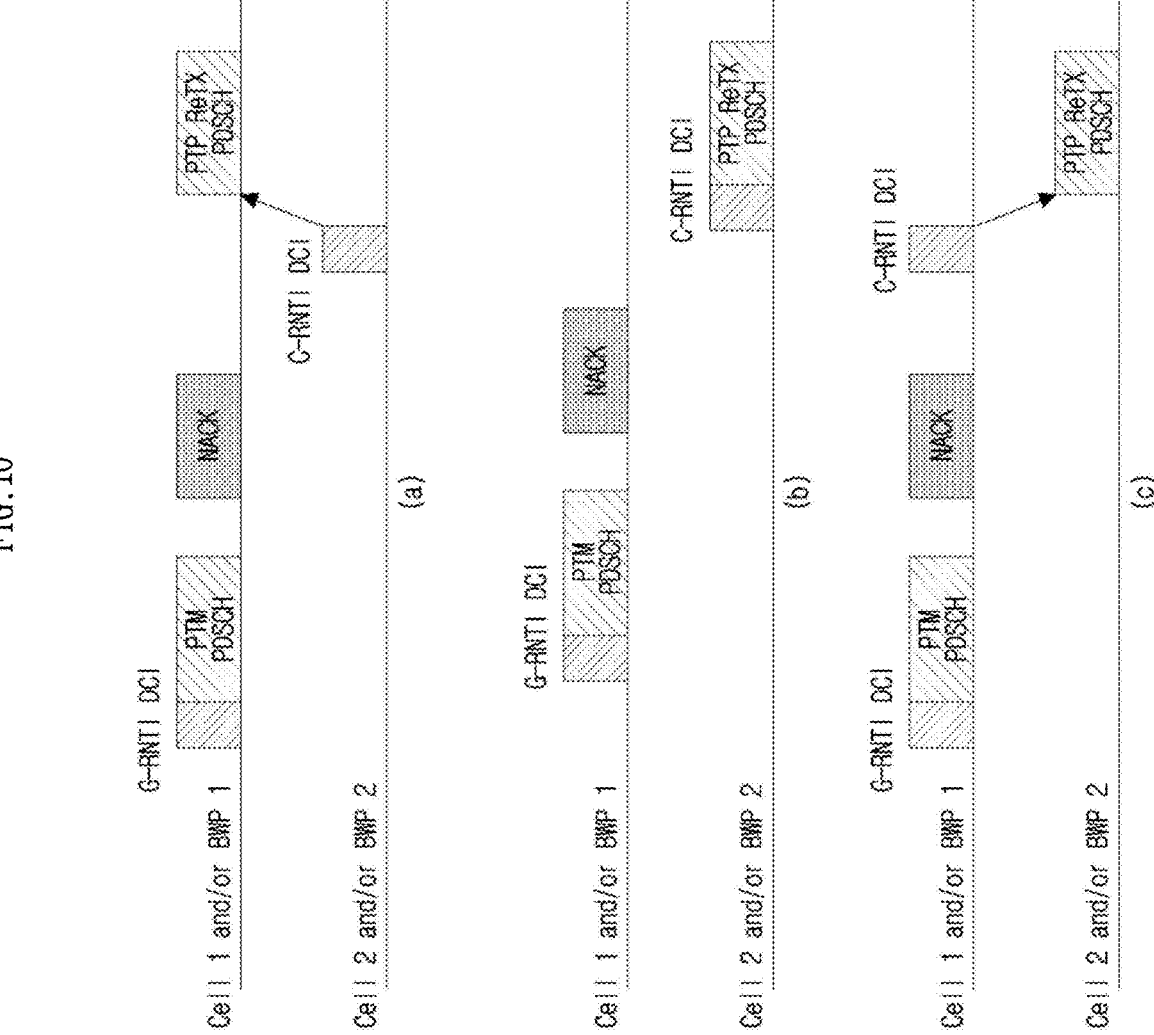
FIG. 10 illustrates a PTP transmission method according to self-carrier scheduling or cross-carrier scheduling in a wireless communication system to which the present disclosure may be applied.

In this case, as shown in (a) of FIG. 10, the PDSCH of the CA scheduled cell may be cross-carrier scheduled using the DCI of the G-RNTI transmitted from the CA scheduling cell.

At this time, the DCI of the G-RNTI may include a cell index. The base station may enable all terminals in the group to interpret the cell index of the group common DCI as the same cell by transmitting an RRC message dedicated to individual UEs to the UE.

As an example, it is assumed that CFR is configured in a CA scheduling cell. In this case, if there is no PDSCH-config in the CFR of the CA scheduling cell, only cross-carrier scheduling may be possible. Accordingly, the UE may expect that the PDSCH of the CA scheduled cell is cross-carrier scheduled with the DCI of the G-RNTI transmitted from the CA scheduling cell.

In this case, the group common DCI of G-RNTI does not need to include a cell index indicating a CA scheduled cell. The UE may determine that the DCI of the G-RNTI transmitted from the specific CA scheduling cell performs cross-carrier scheduling only on the PDSCH of the specific CA scheduled cell according to the RRC message configuration of the base station.

If there is PDSCH-config in the CFR of the CA scheduling cell, the base station may indicate cross-carrier scheduling or intra-carrier scheduling with the cell index of the group common DCI. Accordingly, the UE may receive the group common PDSCH in the CA scheduled cell or CA scheduling cell according to the cell index of the group common DCI.

Embodiment 1-3

When PDCCH-config for multicast and PDSCH-config for multicast are configured in CA's scheduled cell, the UE may not expect PTP retransmission in any cell from the base station or may expect PTP retransmission only in the CA scheduling cell without expecting PTP retransmission only in the CA scheduled cell. A cell that schedules broadcast and/or multicast transmission for MBS or is scheduled may operate according to an example described later.

As an example of the present disclosure (Example 1-3-1), when a NACK for a TB transmitted through the PTM PDSCH of cell 1 is received from a specific UE, the base station may schedule the PTP retransmission PDSCH of cell 2 through the DCI of cell 2. In this case, cell 1 may be a scheduled cell of CA, and cell 2 may be a scheduling cell of CA.

At this time, as shown in (b) of FIG. 10, the UE may transmit NACK in cell 1 through the UE common PUCCH. As another example, the UE may transmit NACK in cell 2 through UE-dedicated PUCCH.

As another example of the present disclosure (Example 1-3-2), when a NACK for a TB transmitted through the PTM PDSCH of cell 1 is received from a specific UE, The base station may indicate PTM transmission of cell 1 through DCI of cell 2 and schedule PTP retransmission PDSCH of cell 2. In this case, cell 1 is a scheduled cell of CA, and cell 2 is a scheduling cell of CA.

For example, the DCI of cell 2 includes a cell index for cell 1 and an indicator indicating PTP retransmission. Depending on the configuration of the base station, the UE may soft-combine the TB received through the PTM of cell 1 and the TB received from the PTP retransmission PDSCH of cell 2 into a soft buffer of the same HARQ process according to the cell index for cell 1 indicated by the DCI of cell 2.

At this time, as shown in (b) of FIG. 10, the UE may transmit NACK in cell 1 through the UE common PUCCH. As another example, the UE may transmit NACK in cell 2 through UE-dedicated PUCCH.

As another example of the present disclosure (Example 1-3-3), when a NACK for a TB transmitted through the PTM PDSCH of cell 1 is received from a specific terminal, the base station may schedule the PTP retransmission PDSCH of cell 1 through the DCI of cell 2. In this case, cell 1 may be a scheduled cell of CA, and cell 2 may be a scheduling cell of CA.

For example, as shown in (a) of FIG. 10, the DCI of cell 2 may include a cell index for cell 1 and an indicator indicating PTP retransmission. According to the configuration of the base station, the UE may receive the PTP retransmission PDSCH in cell 1 according to the cell index for cell 1 indicated by the DCI of cell 2. The UE may soft combine the TB received through the PTM of cell 1 and the TB received from the PTP retransmission PDSCH of cell 1 into a soft buffer of the same HARQ process.

As another example of the present disclosure (Example 1-3-4), the base station may semi-statically match cell 1 PTM transmission and cell 2 PTP retransmission through an RRC message or MAC CE. In this case, the DCI for PTP retransmission does not need to indicate the PTM transmission cell. If the HPN of the DCI is the same, the UE determines that cell 1 PTM transmission and cell 2 PTP retransmission transmit the same TB through an RRC message or MAC CE, and may soft-combine them into a soft buffer of the same HARQ process.

As another example of the present disclosure (Embodiment 1-3-5), a CA scheduled cell may support both self-carrier scheduling and cross-carrier scheduling for PTP retransmission.

That is, for PTP retransmission, the base station may transmit a PTP PDCCH in a CA scheduled cell or a CA scheduling cell and transmit a PTP PDSCH in a CA scheduled cell. For example, the base station may be configured to support all schemes according to embodiment 1-3-1, embodiment 1-3-2, and/or embodiment 1-3-3. At this time, DCI for PTP retransmission may be transmitted to PCell or/and SCell.

In the above-described embodiment, when cell 2 is a CA scheduled cell, DCI of C-RNTI for scheduling PTP retransmission may be transmitted through CSS. Alternatively, when USS is configured in cell 2, PTP retransmission may be scheduled through USS.

Additionally or alternatively, when cell 2 is a CA scheduling cell in the above-described embodiment, the DCI of the C-RNTI that schedules PTP retransmission may schedule PTP retransmission through CSS or USS.

Embodiment 1-4

When PDCCH-config for multicast and PDSCH-config for multicast are configured in the CA's scheduled cell, the UE may expect PTP retransmission for the first PTM transmission in the CA's scheduled cell.

As an example of the present disclosure (Example 1-4-1), it is assumed that PTP retransmission is self-carrier scheduling of a CA scheduled cell.

For example, when a NACK for a TB transmitted through the PTM PDSCH of cell 1 is received from a specific UE, the base station may schedule the PTP retransmission PDSCH of cell 1 through the DCI of cell 1. In this case, cell 1 may be a CA scheduled cell. At this time, for cell', which is a CA scheduled cell, DCI of C-RNTI for scheduling PTP retransmission is transmitted through CSS. Alternatively, when USS is configured in cell 1, PTP retransmission may be scheduled through USS.

As another example of the present disclosure (embodiment 1-4-2), it is assumed that PTP retransmission is cross-carrier scheduling of a CA scheduled cell.

For example, as shown in (c) of FIG. 10, when a NACK for a TB transmitted through the PTM PDSCH of cell 1 is received from a specific UE, the base station may schedule the PTP retransmission PDSCH of cell 2 through the DCI of cell 1. At this time, cell 1 is a CA scheduled cell. And, Cell 2 may be a CA scheduled cell or a CA scheduling cell.

That is, PTP retransmission may be performed by transmitting the PDCCH in the CA scheduled cell and transmitting the PDSCH in the other serving cell. At this time, for cell 1, which is a CA scheduled cell, DCI of C-RNTI for scheduling PTP retransmission may be transmitted through CSS. Alternatively, when USS is configured in cell 1, PTP retransmission may be scheduled through USS.

The UE may soft-combine the TB received through the PTM of cell1 and the TB received through the PTP retransmission PDSCH of cell 2 into a soft buffer of the same HARQ process.

As another example of the present disclosure (Example 1-4-3), when a NACK for a TB transmitted through the PTM PDSCH of cell 1 is received from a specific UE, the base station may schedule the PTP retransmission PDSCH of cell 2 through the DCI of cell 2. In this case, both cell 1 and cell 2 may be CA scheduled cells.

At this time, as shown in (b) of FIG. 10, the UE may transmit NACK in cell 1 through the UE common PUCCH. As another example, the UE may transmit NACK in cell 2 through UE-dedicated PUCCH.

As another example of the present disclosure (Example 1-4-4), when a NACK for a TB transmitted through the PTM PDSCH of cell 1 is received from a specific UE, the base station may indicate PTM transmission of cell 1 through DCI of cell 2 and schedule PTP retransmission PDSCH of cell 2. In this case, both cell 1 and cell 2 may be CA scheduled cells.

For example, DCI of cell 2 may include a cell index for cell 1 and an indicator indicating PTP retransmission. Depending on the configuration of the base station, the UE may soft combine the TB received through the PTM of cell 1 and the TB received from the PTP retransmission PDSCH of cell 2 into the soft buffer of the same HARQ process according to the cell index for cell 1 indicated by the DCI of cell 2.

At this time, as shown in (b) of FIG. 10, the UE may transmit NACK in cell 1 through the UE common PUCCH. As another example, the UE may transmit NACK in cell 2 through UE-dedicated PUCCH.

As another example of the present disclosure (Example 1-4-5), the base station may semi-statically match cell 1 PTM transmission and cell 2 PTP retransmission through an RRC message or MAC CE.

In this case, the DCI for PTP retransmission does not need to indicate the PTM transmission cell. If the HPN of the DCI is the same, the UE may determine that cell 1 PTM transmission and cell 2 PTP retransmission transmit the same TB through an RRC message or MAC CE, and may soft combine them into a soft buffer of the same HARQ process.

As another example of the present disclosure (Embodiment 1-4-6), a CA scheduled cell may support both self-carrier scheduling and cross-carrier scheduling for PTP retransmission.

That is, for PTP retransmission, a base station may transmit a PTP PDCCH in a CA scheduled cell or a CA scheduling cell, and transmit a PTP PDSCH in a CA scheduled cell. For example, the base station may be configured to support all schemes according to embodiment 1-4-1, embodiment 1-4-2, embodiment 1-4-3, or/and embodiment 1-4-4. At this time, DCI for PTP retransmission may be transmitted to PCell or SCell.

In the above methods, cell 1 may be replaced with BWP 1, and cell 2 may be replaced with BWP2. BWP 1 and BWP 2 may belong to the same cell or may be set to belong to different cells.

Embodiment 2

Embodiment 2 relates to an operation of receiving a plurality of PDS CHs in a plurality of CFRs of a plurality of serving cells.

The UE may receive the PDSCH only on the SCell for multicast rather than on the PCell according to UE capabilities.

It is assumed that the UE is interested in receiving a plurality of G-RNTIs in a plurality of serving cells, but cannot receive FDM PDSCHs for the plurality of G-RNTIs. At this time, when a plurality of serving cells are configured for the same G-RNTI, the base station may inform the UE which serving cell is used for PDSCH scheduling for the G-RNTI through an RRC message, MAC-CE, or DCI.

For example, the base station may inform the terminal that one serving cell has been changed to another serving cell for PDSCH scheduling for the G-RNTI.

When different search spaces for multicast are configured in one or more serving cells or when different search spaces for multicast in one or more serving cells overlap in the same slot, an operation according to an option described later may be performed.

Option A: The UE may prioritize PDCCH monitoring in the search space for multicast in the serving cell having the lowest serving cell index or lowest CIF value.

The UE may drop PDCCH monitoring for search space(s) for multicast to other serving cells with serving cell index(s) higher than the lowest serving cell index or CIF value higher than the lowest CIF value.

Option B: The UE may prioritize PDCCH monitoring in the search space for multicast in PCell. The UE may stop PDCCH monitoring in the search space (s) for multicast of SCell (s).

Option C: The UE may prioritize PDCCH monitoring in the search space for multicast in the serving cell mapped to the G-RNTI.

Specifically, the UE may stop monitoring the PDCCH in the search space (s) for multicast of another serving cell mapped to another G-RNTI having a lower priority. When a plurality of serving cells are mapped to the same G-RNTI having a higher priority, the UE may select a serving cell having the lowest serving cell index or CIF value from among the serving cells. The UE may stop monitoring the PDCCH in a search space for multicast of another serving cell mapped to the same G-RNTI.

Alternatively, when a plurality of serving cells having high priorities are mapped to the G-RNTI, the UE may select a PCell from among the serving cells. The UE may stop monitoring the PDCCH in the search space for multicast of the SCell mapped to the same G-RNTI.

Alternatively, when multiple serving cells are mapped to a high-priority G-RNTI, the UE may prioritize PDCCH monitoring in a multicast search space having the lowest search space index among a plurality of serving cells mapped to the same G-RNTI. The UE may drop PDCCH monitoring for other search space(s) for multicast among a plurality of serving cells mapped to the same G-RNTI.

Option D: The UE may prioritize PDCCH monitoring in a search space for multicast having the lowest search space index among overlapping search spaces of one or more serving cells.

As another example of the present disclosure, it is assumed that multicast DCI schedules PDSCHs in the same slot in one or more serving cells, and the scheduled PDSCHs transmit the same TB or transmit different TBs for the same G-RNTI. At this time, the UE may perform an operation according to an option described later.

Option 1: The UE may receive a PDSCH scheduled by a DCI indicating a high priority and drop reception of a PDSCH scheduled by a DCI indicating a low priority among PDSCHs.

Option 2: The UE may stop receiving the PDSCH on the SCell(s) and receive the PDSCH on the PCell among the PDSCHs.

Option 3: The UE may receive the PDSCH in the cell having the lowest serving cell index or CIF value among the PDSCHs, and may drop PDSCH reception in other cell(s).

Option 4: The UE may drop PDSCH reception scheduled by DCI in other search space(s) among PDSCHs and receive PDSCH scheduled by DCI in the search space having the lowest search space index.

As another example of the present disclosure, it is assumed that multicast DCI schedules PDSCHs in the same slot in one or more serving cells, and the scheduled PDSCHs transmit TBs for different G-RNTIs. At this time, the UE may perform an operation according to an option described later.

Option 1: The UE may receive a PDSCH scheduled by DCI for a G-RNTI having a higher priority among PDSCHs, and drop PDSCH reception scheduled by DCI for other G-RNTI(s) having a lower priority among PDSCHs.

The base station may inform the terminal of the priority of each G-RNTI that the UE wants to receive through an RRC message, MAC-CE, or DCI.

Option 2: The UE may stop receiving the PDSCH on the SCell(s) and receive the PDSCH on the PCell among the PDSCHs.

Option 3: The UE may receive the PDSCH in the cell having the lowest serving cell index or CIF value among the PDSCHs, and may drop PDSCH reception in other cell(s).

Option 4: The UE may drop PDSCH reception scheduled by DCI in other search space(s) among PDSCHs and receive PDSCH scheduled by DCI in the search space having the lowest search space index.

When multicast DCI schedules PDSCH in the same slot in one or more serving cells and the UE receives one of the PDSCHs, the UE may include ACK or NACK for the received PDSCH in the HARQ-ACK codebook according to the decoding result of the received PDSCH, and may include all NACKs for the remaining PDSCHs in the corresponding HARQ-ACK codebook.

At this time, the UE may transmit the HARQ-ACK codebook through PUCCH or PUSCH according to an option described later.

Option 1: The UE may always transmit the HARQ-ACK codebook in the PCell regardless of the cell in which the PDSCH is received.

Option 2: Regardless of the cell in which the PDSCH is received, if the base station configures it, the UE may transmit the HARQ-ACK codebook in the PUCCH-SCell.

Option 3: The UE may transmit the HARQ-ACK codebook on the PCell or PUCCH-SCell of the PUCCH group to which the cell receiving the PDSCH belongs.

Alternatively, when the UE receives one of the PDSCHs and the scheduled PDSCH transmits the same TB or TB for the same G-RNTI, the UE may include all ACKs or all NACKs for all scheduled PDSCHs in the HARQ-ACK codebook according to the decoding result of the received PDSCH. That is, the UE may replicate the received PDSCH decoding result for all scheduled PDSCHs of the HARQ-ACK codebook.

Alternatively, when the UE receives one of the PDSCHs and the scheduled PDSCH transmits the same TB or TB for the same G-RNTI, the UE may include ACK or NACK for the received PDSCH in the HARQ-ACK codebook according to the decoding result of the received PDSCH, and may not include HARQ feedback for the remaining PDSCHs in the HARQ-ACK codebook.

Embodiment 3

Embodiment 3 relates to CFR deactivation according to SCell deactivation.

For CFR deactivation upon SCell deactivation, the base station and the UE may perform an operation according to an option described later.

Option 1: When SCell is deactivated, CFR(s) related to the deactivated SCell may also be deactivated.

When the SCell for each SCell of each UE is deactivated by the RRC message, the base station may configure whether or not the CFR related to the deactivated SCell is deactivated.

Additionally or alternatively, when deactivating the SCell for each SCell of each terminal by an RRC message, the base station may configure the CFR related to the deactivated SCell to be deactivated.

Option 2 UE-specific SCell activation/deactivation MAC CE may inform the UE whether the CFR(s) associated with the deactivated SCell are deactivated even when the SCell is deactivated and/or whether the CFR(s) associated with the deactivated SCell are deactivated even when the SCell is deactivated.

Option 2-1: MAC CE may additionally indicate 1 bit for each deactivated cell in which CFR is configured. The 1 bit may indicate whether the CFR related to the UE active BWP of the deactivated SCell is also deactivated.

Option 2-2: MAC CE may additionally indicate 1 bit for each G-RNTI. The 1 bit may indicate whether the CFR related to the UE active BWP of the deactivated SCell is also deactivated for each G-RNTI.

Option 2-3: The RRC message may configure whether to deactivate the CFR related to the UE active BWP of the deactivated SCell when receiving the SCell activation/de-activation MAC CE.

Option 3: The UE-specific RRC message or MCCH message may configure whether to also deactivate CFR(s) related to the deactivated SCell when the SCell is deactivated based on a timer related to SCell deactivation (e.g., 'SCelldeactivationTimer').

When deactivating the SCell for each SCell for each UE, the base station may configure whether to deactivate the CFR (s) related to the deactivated SCell.

Additionally or alternatively, when deactivating the SCell for each SCell for each UE, the base station may configure the CFR related to the deactivated SCell to be deactivated.

Option 4: CFR Activation/Deactivation MAC CE may notify the UE whether or not the CFR is deactivated regardless of whether the SCell related to the CFR is deactivated. CFR activation/deactivation MAC CEs can be UE-specific or cell-specific or group-common.

Option 4-1: CFR activation/deactivation MAC CE may indicate an index for the deactivated CFR. The index of CFR may be configured by an RRC message.

Option 4-2: CFR activation/deactivation MAC CE may indicate a serving cell index or CIF value to the serving cell of the deactivated CFR. Upon receiving the MAC CE, the UE may deactivate all CFRs belonging to the indicated cell.

Option 4-3: CFR activation/deactivation MAC CE may indicate a BWP index for a BWP related to the deactivated CFR. Upon receiving the MAC CE, the UE may deactivate CFR.

Option 5: A specific DCI format may inform the UE of whether the CFR is deactivated regardless of whether the SCell associated with the CFR is deactivated.

Option 5-1: DCI transmitted to a cell may indicate an index of a deactivated CFR of a corresponding cell or a specific cell. The index of CFR may be configured by an RRC message. Upon receiving the DCI, the UE may deactivate CFR.

Option 5-2: The DCI transmitted to the cell may indicate a serving cell index or CIF value to the serving cell of the deactivated CFR. Upon receiving the DCI, the UE may deactivate all CFRs belonging to the designated cell.

Option 5-3: DCI transmitted from a cell may indicate a BWP index for a BWP related to a deactivated CFR of a corresponding cell or a specific cell. Upon receiving the DCI, the UE may deactivate CFR.

Option 6: When SCell is deactivated, the UE may switch to default BWP or dormant BWP.

If the basic BWP or dormant BWP does not provide CFR, the UE may switch to the basic BWP or dormant BWP when SCell is deactivated. A basic BWP or dormant BWP may belong to an deactivated SCell or a SCell represented by a base station.

When Scell is supported for multicast, when ACK/NACK is enabled, the UE may transmit multicast ACK/NACK in SCell or/and PCell. The base station may configure resources in the PCell or PScell. As another example, the base station may configure resources in the PCell to be compatible with a UE that does not support CA.

As an example, it is assumed that a Type 1 HARQ-ACK codebook is configured for a UE by multicast. When SCell is deactivated, for an active DL BWP to determine a set of $M_{A,c}$ occasions for receiving candidate PDSCHs for unicast HARQ-ACK, the DL BWP of the deactivated cell may be a DL BWP having an index provided by 'firstActiveDown-linkBWP-Id' for the deactivated cell. A codebook may be set/configured with the k1/TDRA value of the first active BWP criterion.

If the multicast CFR is in the deactivated SCell, the k1/TDRA value in the Type 1 HARQ-ACK codebook may be determined according to the CFR.

For example, when CFR is in the first active BWP, the k1/TDRA value may be determined based on the first active BWP. As another example, if CFR is not in the first active BWP, the HARQ-ACK bit may not be included in the codebook (i.e., 0 bit). As another example, if there is a CFR in the lowest/latest BWP index, it may be determined as a corresponding k1/TDRA value. As another example, if there is no CFR in the lowest/recent BWP index, the HARQ-ACK bit may not be included in the codebook (i.e., 0 bit).

As an embodiment of the present disclosure, an active DL BWP for determining a set of k1 values for the Type 1 codebook of multicast HARQ-ACK, occasions for candidate PDSCH reception, and multicast HARQ-ACK may be con-figured/determined/defined according to an option described later.

Option 1: The DL BWP of the deactivated cell may be a DL BWP with an index provided by 'firstActiveDown-linkBWP-Id' for the deactivated cell.

Option 2: The DL BWP of the deactivated cell may be a DL BWP with an index provided by 'DownlinkBWP-Id' of the DL BWP configured for multicast for the deactivated cell.

Option 3: Assume that there is no CFR associated with 'firstActiveDownlinkBWP-Id' for the deactivated cell.

Option 3A: The DL BWP of the deactivated cell may be the DL BWP with the lowest index provided by 'Down-linkBWP-Id' for the deactivated cell among DL BWP(s) related to CFR.

Option 3B: The DL BWP of the deactivated cell may be the latest active DL BWP for the deactivated cell among the DL BWP(s) related to the CFR.

Option 3C: Multicast HARQ-ACK bits corresponding to deactivated cells may not be included in the codebook.

Option 3D: The multicast HARQ-ACK bit corresponding to the deactivated cell may be configured to NACK in the codebook.

Embodiment 4

Embodiment 4 relates to PUCCH transmission in a PUCCH-SCell for multicast HARQ-ACK feedback.

When the PUCCH-SCell is configured for the UE, the number of serving cells in the PUCCH group may be determined, and the UE may operate according to an option described later.

Option 1: If the PTM PDSCH in the SCell is scheduled by the SCell (i.e., self-scheduling), the UE may expect that the HARQ-ACK for the PTM PDSCH in the SCell is configured to the PUCCH-SCell.

Option 2: When a primary or secondary PUCCH group is configured in the SCell for unicast, the UE may use a PUCCH cell (e.g., PCell or PUCCH SCell) of the PUCCH group to transmit HARQ-ACK for the PTM PDSCH on the SCell.

Option 3: Regardless of whether a secondary PUCCH group is configured for the SCell for unicast, the UE may use a PUCCH cell of the default PUCCH group to transmit HARQ-ACK on the PTM PDSCH in the SCell.

Option 4: Regardless of whether the secondary PUCCH group is configured for the SCell for unicast, the UE may transmit HARQ-ACK for the PTM PDSCH in the SCell using the PUCCH-SCell of the secondary PUCCH group.

As an embodiment of the present disclosure, when the PUCCH-SCell is not configured for the UE, the UE may transmit HARQ-ACK for the PTM PDSCH in an arbitrary SCell using a PUCCH cell of a default PUCCH group.

Specifically, the UE may perform PUCCH transmission for multicast HARQ-ACK according to an option described later. That is, when the SCell related to CFR belongs to the secondary PUCCH group of the PUCCH-SCell, the UE may transmit the PUCCH including the ACK/NACK-based HARQ-ACK for multicast according to one of the options described below.

Option 1: While transmitting multicast HARQ-ACK on PUCCH of PCell in response to multicast PDSCH in serving cell of primary PUCCH group, the UE may transmit multicast HARQ-ACK on the PUCCH of the PUCCH-SCell in response to the multicast PDSCH on the serving cell of the secondary PUCCH group.

Option 2: When multicast HARQ-ACK is configured for PUCCH of PUCCH-SCell, while transmitting multicast HARQ-ACK on PUCCH of PCell in response to multicast PDSCH in serving cell of primary PUCCH group, the UE may transmit multicast HARQ-ACK on the PUCCH of the PUCCH-SCell in response to the multicast PDSCH in the serving cell of the secondary PUCCH group.

If multicast HARQ-ACK is not configured for PUCCH of PUCCH-SCell, the UE may transmit multicast HARQ-ACK on the PUCCH of the PCell in response to the multicast PDSCH in the serving cell of the primary PUCCH group or the secondary PUCCH group.

Option 3: When multicast HARQ-ACK is configured only for PUCCH of PUCCH-SCell, the UE may transmit multicast HARQ-ACK on the PUCCH of the PUCCH-SCell in response to the multicast PDSCH in the serving cell of the primary PUCCH group or the secondary PUCCH group.

As an embodiment of the present disclosure, when a SCell related to CFR belongs to a secondary PUCCH group of a PUCCH-SCell, a UE may perform PUCCH transmission for NACK-only based HARQ-ACK for multicast according to an option described later.

Option 1: While transmitting multicast HARQ-ACK on PUCCH of PCell in response to multicast PDSCH in serving cell of primary PUCCH group, the UE may transmit multicast HARQ-ACK on the PUCCH of the PUCCH-SCell in response to the multicast PDSCH on the serving cell of the secondary PUCCH group.

Option 2: When multicast HARQ-ACK is configured for PUCCH of PUCCH-SCell, while transmitting multicast HARQ-ACK on PUCCH of PCell in response to multicast PDSCH in serving cell of primary PUCCH group, the UE may transmit multicast HARQ-ACK on the PUCCH of the PUCCH-SCell in response to the multicast PDSCH in the serving cell of the secondary PUCCH group.

If multicast HARQ-ACK is not configured for PUCCH of PUCCH-SCell, the UE may transmit multicast HARQ-ACK on the PUCCH of the PCell in response to the multicast PDSCH in the serving cell of the primary PUCCH group or the secondary PUCCH group.

Option 3: When multicast HARQ-ACK is configured only for PUCCH of PUCCH-SCell, the UE may transmit multicast HARQ-ACK on the PUCCH of the PUCCH-SCell in response to the multicast PDSCH in the serving cell of the primary PUCCH group or the secondary PUCCH group.

In the above-described option, the UE may be configured to ACK/NACK based HARQ-ACK or NACK only based HARQ-ACK for each G-RNTI. The UE may perform PUCCH transmission for each G-RNTI according to one of the above-described options.

Figure 11:
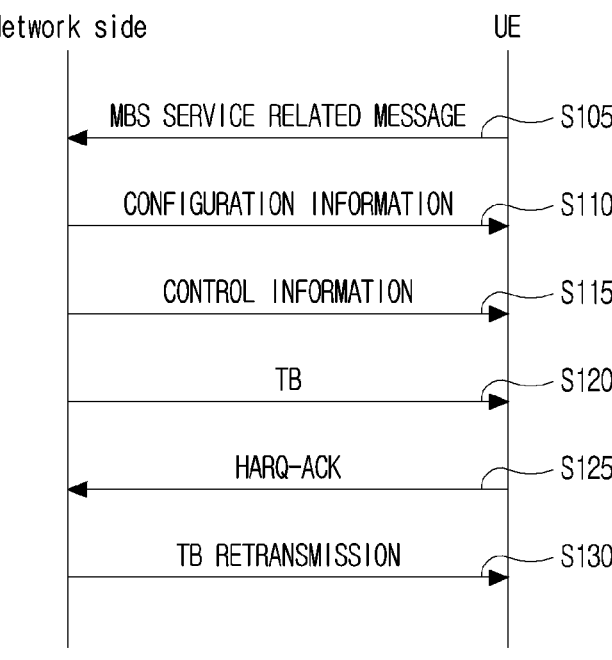
FIG. 11 is a diagram for describing a signaling procedure of a network side and a terminal according to an embodiment of the present disclosure.

FIG. 11 is a diagram for describing a signaling procedure of a network side and a terminal according to an embodiment of the present disclosure.

FIG. 11 illustrates an embodiment of signaling between a network side and a terminal (UE) in a situation to which the above-described embodiments (e.g., Embodiment 1, Embodiment 2, Embodiment 3, Embodiment 4, or a combination of one or more of the sub-examples) of the present disclosure may be applied.

Here, the UE/network side is exemplary, and may be replaced with various devices to be described with reference to FIG. 12. FIG. 11 is for convenience of description, and does not limit the scope of the present disclosure. Also, some step(s) shown in FIG. 11 may be omitted depending on circumstances and/or settings. In addition, in the operation of the network side/UE of FIG. 11, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/ remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may enter the RRC_CONNECTED mode, and may report a message indicating one or more interested MBS services to the network side (S105).

Here, the message may be reported to the network side through at least one of Uplink Control Information (UCI), Control Element (MAC CE), and RRC messages. In addition, the MBS service of interest in the message may mean one of TMGI or G-RNTI listed in the DL message received from the network side.

For example, the DL message may be a service availability message listing TMGI #1, TMGI #3, TMGI #5, and TMGI #10. When the UE is interested in TMGI #5, the UE may indicate the order of TMGI #5 in the message. That is, the UE may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

For example, the above-described operation of transmitting the message from the UE (100 or 200 in FIG. 12) to the network side (200 or 100 in FIG. 12) in step S105 may be implemented by the device of FIG. 12 to be described below. For example, referring to FIG. 12, one or more processors 102 may control one or more transceivers 106 and/or one or more memories 104 to transmit the message, and the one or more transceivers 106 may transmit the message to a network side.

Upon receiving the message, the network side may transmit configuration information to the terminal through an RRC message (S110).

For example, the configuration information may include CFR (common frequency resource) configuration information, one or more group common PDSCH configuration information including TCI status for one or more G-RNTI values, and search space configuration information including TCI state for one or more G-RNTI values.

Here, the RRC message may be a group common message transmitted through a PTM MCCH (Multicast Control Channel) or a UE-dedicated message transmitted through a UE-specific DCCH (Dedicated Control Channel).

And, CFR may include DL CFR and UL CFR. For example, one DL CFR may provide a group common PDCCH and a group common PDSCH transmission resource for MBS transmission and reception. One UL CFR may provide HARQ-ACK PUCCH resources for group common PDSCH reception. One CFR may be one MBS-specific BWP or one UE-specific BWP. Additionally or alternatively, one or multiple CFRs may be configured within one UE-specific BWP. One CFR may have a connection relationship with one UE-specific BWP.

The UE may be configured with at least a G-RNTI value for each MBS CFR or each serving cell. GC-CS-RNTI may be configured/used for activation, retransmission or release of one or more group common SPS configurations.

When the UE is not configured with GC-CS-RNTI for CFR or serving cell, and CS-RNTI is configured for CFR or serving cell, the UE may use CS-RNTI for activating, retransmitting, or releasing of one or more group common SPS configurations.

The network side may associate one GC-CS-RNTI value with a TMGI list or a G-RNTI list. In this case, the network side may provide a TMGI list or a G-RNTI list associated with the GC-CS-RNTI value.

Each group common SPS configuration (i.e., SPS-config) may be set as the following information element as shown in Table 6 below.

TABLE 6

```
PDSCH-Config ::= SEQUENCE {
  dataScramblingIdentityPDSCH INTEGER (0..1023) OPTIONAL, -- Need S
  dmrs-DownlinkForPDSCH-MappingTypeA SetupRelease { DMRS-
DownlinkConfig } OPTIONAL, -- Need M
  dmrs-DownlinkForPDSCH-MappingTypeB SetupRelease { DMRS-
DownlinkConfig } OPTIONAL, -- Need M
  tci-StatesToAddModList SEQUENCE (SIZE(1..maxNrofTCI-States)) OF TCI-
State OPTIONAL, -- Need N
  tci-StatesToReleaseList SEQUENCE (SIZE(1..maxNrofTCI-States)) OF TCI-
StateId OPTIONAL, -- Need N
  vrb-ToPRB-Interleaver ENUMERATED {n2, n4} OPTIONAL, -- Need S
  resourceAllocation ENUMERATED { resourceAllocationType0,
resourceAllocationType1, dynamicSwitch},
  pdsch-TimeDomainAllocationList SetupRelease { PDSCH-
TimeDomainResourceAllocationList } OPTIONAL, -- Need M
  pdsch-AggregationFactor ENUMERATED { n2, n4, n8 } OPTIONAL, -- Need S
  rateMatchPatternToAddModList SEQUENCE (SIZE
(1..maxNrofRateMatchPatterns)) OF RateMatchPattern OPTIONAL, -- Need N
  rateMatchPatternToReleaseList SEQUENCE (SIZE
(1..maxNrofRateMatchPatterns)) OF RateMatchPatternId OPTIONAL, -- Need N
  rateMatchPatternGroup1 RateMatchPatternGroup OPTIONAL, -- Need R
  rateMatchPatternGroup2 RateMatchPatternGroup OPTIONAL, -- Need R
  rbg-Size ENUMERATED {config1, config2},
  mcs-Table ENUMERATED {qam256, qam64LowSE} OPTIONAL, -- Need S
  maxNrofCodeWordsScheduledByDCI ENUMERATED {n1, n2}
  ... }
```

For example, an operation in which the UE (100 or 200 of FIG. 12) in step S110 receives the configuration information from the network side (200 or 100 of FIG. 12) may be implemented by the device of FIG. 12 to be described below. For example, referring to FIG. 12, one or more processors 102 may control one or more transceivers 106 and/or one or more memories 104 to receive the configuration information, and one or more transceivers 106 may receive the configuration information from a network side. The UE may receive control information from the network side (S115). For example, the UE may receive downlink control information (DCI) for scheduling/activating/releasing uplink/downlink from the network side.

Specifically, if a search space is configured for a configured CFR, the UE may receive DCI scrambled with CRC as G-RNTI or G (group)-CS (configured scheduling)-RNTI by monitoring PDCCH in SS (search space) configured in configured CFR.

For example, an operation in which the UE (100 or 200 of FIG. 12) receives the control information from the network side (200 or 100 of FIG. 12) in step S115 described above may be implemented by the device of FIG. 12 to be described below. For example, referring to FIG. 12, one or more processors 102 may control one or more transceivers 106 and/or one or more memories 104 to receive the control information, and one or more transceivers 106 may receive the control information from a network side.

The UE may receive TB from the network side (S120).

Specifically, when the data unit is available on the MTCH of the MBS radio bearer (MRB) for the MBS service, the network side may configure a TB associated with the G-RNTI that includes data unit for SPS PDSCH case associated with MTCH of MRB for MBS service, or associated with TMGI of MBS service, or associated with short ID of MBS service or is mapped to the MBS service according to service-to-resource mapping and transmit it to the UE.

For group common dynamic scheduling of TB, the network side may transmit DCI to the UE through the PDCCH. The corresponding DCI may be CRC scrambled by G-RNTI, G-CS-RNTI, or CS-RNTI. The PDCCH may be implemented as a group common PDCCH or a UE-specific PDCCH.

For example, the DCI may include at least one of an identifier for DCI format, carrier indicator, bandwidth part indicator, frequency domain resource assignment, time domain resource assignment, VRB-to-PRB mapping, PRB bundling size indicator, rate matching indicator, ZP CSI-RS trigger, MCS, NDI, RV, HARQ process number, downlink allocation index, TPC command for scheduled PUCCH, a PUCCH resource indicator, a PDSCH-to-HARQ feedback timing indicator, an antenna port, a transmission configuration indicator, an SRS request, a DMRS sequence initialization, and a priority indicator.

For group common dynamic scheduling, by group common or UE specific RRC message or by group common or terminal specific MAC CE, the network side may provide the UE with one or more service-resource mappings for MBS services identified by TMGI or G-RNTI or GC-CS-RNTI. The data of the MBS service may be carried over the multicast traffic logical channel, that is, the MBS radio bearer (MRB) of the MTCH associated with the MBS service. The RRC message may be a group common message transmitted through a PTM Multicast Control Channel (MCCH) or a UE-specific message transmitted through a UE-specific Dedicated Control Channel (DCCH). The DCI scheduling PDSCH carrying MBS service data may also indicate one or more of a short ID, MTCH ID, MRB ID, G-RNTI value and TMGI value for MBS service.

When the UE receives the DCI scrambled by the CRC by the G-RNTI, the UE may determine MBS service(s) associated with one or more of the short ID, MTCH ID, MRB ID, G-RNTI value, and TMGI value for each PDSCH occasion based on the mapping between the MBS service indicated in the DCI and the HPN and/or the mapping between the MBS service indicated in the DCI and the short ID(s).

Then, if the UE is interested in the determined MBS service(s), the UE may receive PDSCH transmission scheduled by DCI. If the UE is not interested in the determined MBS service(s), the UE may not receive PDSCH transmission scheduled by DCI.

For example, an operation in which the UE (100 or 200 of FIG. 12) in step S120 receives the TB from the network side (200 or 100 of FIG. 12) may be implemented by the device of FIG. 12 to be described below. For example, referring to FIG. 12, one or more processors 102 may control one or more transceivers 106 and/or one or more memories 104, etc. to receive the TB, and one or more transceivers 106 may receive the TB from the network side.

Upon receiving the group common DCI indicating the PUCCH resource for the MBS HARQ-ACK, the UE may transmit the HARQ-ACK through the PUCCH after receiving the PDSCH scheduled by the DCI (S125). That is, according to the decoding state of the PDSCH transmission, the UE may transmit HARQ feedback to the network side.

In the case of PTM scheme 1, the group common DCI may indicate a single PUCCH resource indicator and a single PDSCH-to-HARQ feedback timing indicator for at least ACK/NACK-based HARQ-ACK.

Specifically, in the case of UE-specific PUCCH resource allocation for HARQ-ACK based on ACK/NACK for group common DCI, other UEs of the corresponding group may be configured to at least different values of 'PUCCH-Resource' and 'dl-DataToUL-ACK' in UE-dedicated 'PUCCH-config' for multicast or unicast (unless 'PUCCH-config' for multicast is configured). Different PUCCH resources may be allocated to different UEs by the same PUCCH resource indicator and the same PDSCH-to-HARQ feedback timing indicator of the group common DCI.

For PTP retransmission, in the UE-specific DCI, the PUCCH resource indicator and the PDSCH-to-HARQ feedback timing indicator can be interpreted based on 'PUCCH-config' for unicast regardless of whether 'PUCCH-config' for multicast is configured.

Here, the PUCCH Resource Indicator (PRI) may be indicated by a group common DCI as will be described later.

For example, a UE-specific PRI list may be included in DCI (option 1A-1). Each PRI in the list may indicate an entry corresponding to a candidate 'pucch-ResourceId' value of 'PUCCH-config' for allocation of the same PUCCH resource or different PUCCH resources to different terminals of a group that has received the same DCI. Different PRIs of DCI may indicate different entries of 'PUCCH-config'.

Here, the candidate 'pucch-ResourceId' value may be configured by RRC, and at least in multicast 'PUCCH-config', different 'pucch-ResourceId' values may be configured for other UEs of the same group.

As another example, a group common PRI may be included in the DCI (option 1A-2). A single group common PRI may indicate a specific entry for a candidate 'pucch-ResourceId' value in UE-specific 'PUCCH-config' for the same or different PUCCH resource allocation for all UEs in the group.

And, the candidate 'pucch-ResourceId' value may be configured by RRC. At least in 'PUCCH-config' for multicast, different 'pucch-ResourceId' values may be configured for different UEs of the same group.

When 'PUCCH-config' for multicast is configured to HARQ-ACK to group a common PDSCH scheduled by a group common DCI, the UE may assume that the PRI of the group common DCI indicates an entry corresponding to the candidate 'pucch-ResourceId' value of 'PUCCH-config' for multicast.

If 'PUCCH-config' for multicast is not configured for HARQ-ACK for group common PDSCH scheduled by group common DCI, the UE may assume that the PRI of the group common DCI indicates a corresponding entry for the candidate 'pucch-ResourceId' value of 'PUCCH-config' for unicast.

K1 (PDSCH-to-HARQ feedback timing indicator) may be indicated by a group common DCI as will be described later.

For example, a list of UE-specific K1 values may be included in DCI (option 1B-1). Each K1 in the list may indicate the same UL slot or a different UL (sub)slot for other UEs in the group.

For example, different K1 values are assigned to different terminals. That is, a value K1 may be assigned to device 1, a value K2 may be assigned to device 2, and a value K3 may be assigned to device 3.

As another example, a value of K1 may be shared by several terminals. For example, device 1 and device 2 may share a value of K1, and device 3 and device 4 may share a value of K2.

As another example, one K1 value may be a reference, and another K1 value may be assigned based on the reference. {K1_ref, list of K1_offset} may be indicated in DCI.

For example, device 1 may use K1_ref, device 2 may use K1_ref+K1_offest1, and device 3 may use K1_ref+K1_offest2.

As another example, a group common K1 value may be included in DCI (option 1B-2). For example, a single K1 value may indicate a corresponding entry for a candidate 'dl-DataToUL-ACK' value in the UE-specific 'PUCCH-config' for the same or different PUCCH resource allocation for all UEs in a group receiving DCI. This may be applied when the DCI format is configured in the UE-specific 'PUCCH-config' for the K1 value.

As another example, the candidate 'dl-DataToUL-ACK' value is set by RRC, and may be configured differently for different terminals of the same group, at least in 'PUCCH-config' for multicast.

As another example, when 'PUCCH-config' for multicast is configured for HARQ-ACK for grouping a common PDSCH scheduled by group common DCI, the UE may assume that the K1 value of the group common DCI indicates a corresponding entry for the candidate 'dl-DataToUL-ACK' value in 'PUCCH-config' for multicast.

As another example, when 'PUCCH-config' for multicast is not configured for HARQ-ACK for grouping a common PDSCH scheduled by a group common DCI, the UE may assume that the K1 value of the group common DCI indicates an entry corresponding to the candidate 'dl-DataToUL-ACK' value in 'PUCCH-config' for unicast.

In addition, when receiving a group common DCI scrambled by the G-RNTI and/or a UE-specific DCI scrambled by the CRC-RNTI, if the Type-1 HARQ-ACK codebook is configured for 'PUCCH-config' for multicast and/or 'PUCCH-config' for unicast, the UE may configure the TDRA (Time Domain Resource Allocation) to generate a type-1 HARQ-ACK codebook for HARQ-ACK(s) to group the common PDSCH scheduled by the group common DCI and/or the UE specific PDSCH scheduled by the UE specific DCI.

If TB decoding is not successful in a PDSCH transmission occasion, the UE may transmit HARQ NACK to the base station through PUCCH resources in the configured UL CFR.

By using PUCCH resources, the UE may transmit HARQ-ACK on other PDSCH transmissions such as unicast SPS PDSCH, dynamic unicast PDSCH, PTP retransmission and/or dynamic group common PDSCH.

Here, to multiplex HARQ-ACK on PUCCH in (sub)slots for SPS PDSCH for multicast, SPS PDSCH for unicast, dynamically scheduled multicast PDSCH and/or dynamically scheduled unicast PDSCH, the UE may configure a codebook based on one or more of the above options.

If an RSRP threshold is configured, the UE may use NACK-only based HARQ-ACK based NACK based on the RSRP of the measured serving cell. If the measured RSRP is higher than the threshold value, NACK-only based HARQ-ACK may be transmitted through the group common PUCCH resource indicated by the PRI of DCI. If the measured RSRP is lower than the threshold, NACK-only based HARQ-ACK may be changed to ACK/NACK based HARQ-ACK on UE-specific PUCCH resources indicated by PRI of DCI.

On the other hand, if 'pdsch-AggregationFactor' is configured for G-RNTI or 'repeat number' is indicated by DCI from the network side, the TB scheduled by the group common DCI, if configured, may be repeated for the Nth HARQ transmission of the TB within each symbol allocation between each 'pdsch-AggregationFactor' contiguous slot or each 'repeat number' contiguous slot.

For example, the operation of the UE (100 or 200 in FIG. 12) transmitting the HARQ-ACK from the network side (200 or 100 in FIG. 12) in step S125 described above may be implemented by the device of FIG. 12 to be described below. For example, referring to FIG. 12, one or more processors 102 may control one or more transceivers 106 and/or one or more memories 104 to transmit the HARQ-ACK, and the one or more transceivers 106 may transmit the HARQ-ACK from the network side.

Upon receiving the HARQ NACK in the TCI state, the network side may retransmit the PDCCH and the PDSCH using the TCI state in the DL CFR configured for TB retransmission (S130).

The UE may monitor the group common and/or UE specific PDCCH using the TCI state for the search space configured in the DL CFR to receive the TB retransmission. The network side may retransmit the TB to one of the UEs in the group by means of a terminal-specific PDCCH. However, since the other UE successfully received the TB, it may not receive the retransmission of the TB.

When the UE receives the PDCCH for retransmission of TB, the UE may receive the PDSCH scheduled by the DCI of the PDCCH. If the UE successfully decodes TB in PDSCH, the UE may consider that the decoded TB is associated with the short ID of the MTCH, MRB, TMGI, G-RNTI, and/or MBS service based on mapping between MBS service indicated by DCI and HARQ process number (HPN), and/or mapping between MBS service indicated by DCI and short ID(s).

If TB decoding succeeds at the PDSCH transmission occasion, the UE may transmit HARQ ACK to the network side through PUCCH resources in the UL CFR configured according to the above-described procedure. Using the PUCCH resource, the UE may transmit HARQ-ACK on other PDSCH transmissions such as unicast SPS PDSCH, dynamic unicast PDSCH, PTP retransmission and/or dynamic group common PDSCH.

In this case, in order to multiplex HARQ-ACK on PUCCH in (sub)slot for SPS PDSCH for multicast, SPS PDSCH for unicast, dynamically scheduled multicast PDSCH and/or dynamically scheduled unicast PDSCH, the UE may configure a codebook based on one or more of the above-described options/embodiments.

For example, an operation in which the UE (100 or 200 of FIG. 12) receives the TB retransmission from the network side (200 or 100 of FIG. 12) in step S130 described above may be implemented by the device of FIG. 12 to be described below. For example, referring to FIG. 12, one or more processors 102 may control one or more transceivers 106 and/or one or more memories 104 to receive the TB retransmission, and one or more transceivers 106 may receive the TB retransmission from the network side.

General Device to which the Present Disclosure May be Applied

Figure 12:
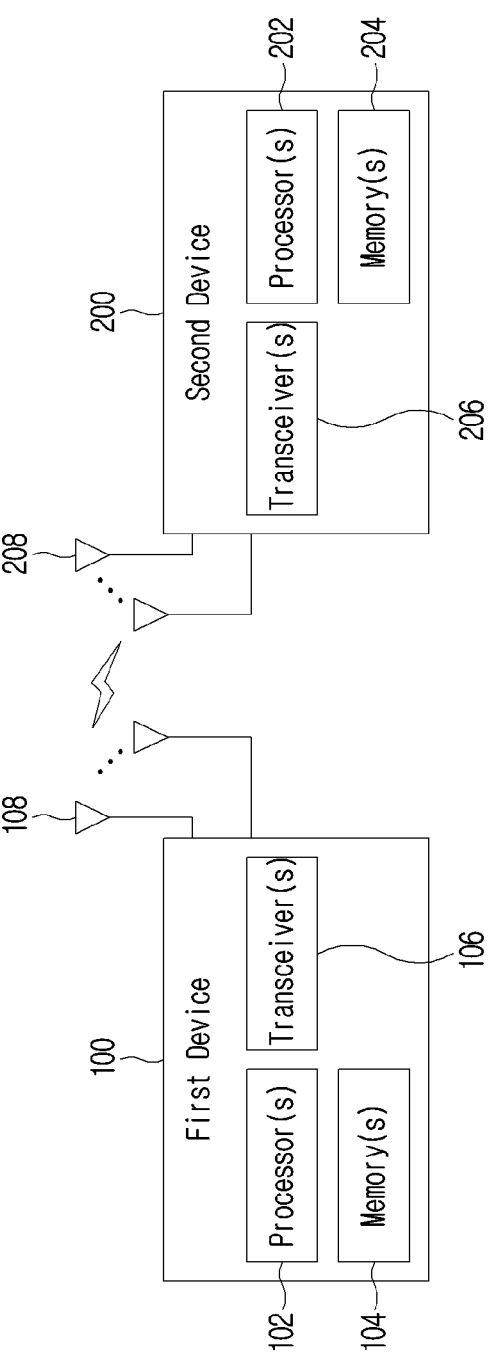
FIG. 12 illustrates a block configuration diagram of a wireless communication device according to an embodiment of the present disclosure.

FIG. 12 illustrates a block diagram of a wireless communication device according to an embodiment of the present disclosure.

In reference to FIG. 12, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a user equipment (UE) from a base station, configuration information related to at least two serving cells;

receiving, by the UE from the base station, a unicast physical downlink shared channel (PDSCH) or multicast PDSCH in a secondary cell (SCell) of a secondary physical uplink control channel (PUCCH) group among the at least two serving cells; and transmitting, by the UE to the base station, a PUCCH including hybrid automatic repeat request (HARQ)-acknowledgment (ACK) information for the unicast PDSCH or the multicast PDSCH, wherein, based on the multicast PDSCH being received from the base station in the SCell, the HARQ-ACK information is transmitted to the base station using a PUCCH resource of a primary cell (PCell) of a primary PUCCH group among the two serving cell, and wherein, based on the unicast PDSCH being received from the base station in the SCell, the HARQ-ACK information is transmitted to the base station using a PUCCH resource of the SCell.

2. The method of claim 1, wherein:

the secondary PUCCH group does not include the PCell.

3. The method of claim 1, wherein:

based on the unicast PDSCH or the multicast PDSCH being received from the base station in the PCell, the HARQ-ACK information is transmitted to the base station using PUCCH resources of the PCell.

4. The method of claim 1, wherein:

based on the SCell being deactivated, a common frequency resource (CFR) associated with the SCell is deactivated.

5. The method of claim 1, wherein:

a CFR associated with the SCell is deactivated by an radio resource control (RRC) message, multicast control channel (MCCH) message, medium access control (MAC)-control element (CE), or downlink control information (DCI) received from the base station.

6. The method of claim 5, wherein:

the DCI includes information indicating at least one of an index of a CFR associated with the SCell, an index or carrier indicator field (CIF) value of the SCell, or an index of a bandwidth part (BWP) associated with the CFR.

7. The method of claim 1, wherein:

capability information related to whether the multicast PDSCH can be received in the SCell is transmitted to the base station.

8. A user equipment (UE) comprising:

at least one transceiver; and at least one processor coupled to the at least one transceiver, wherein the at least one processor is configured to:

receive, from a base station through the at least one transceiver, configuration information related to at least two serving cells;

receive, from the base station through the at least one transceiver, a unicast physical downlink shared channel (PDSCH) or multicast PDSCH in a secondary cell (SCell) of a secondary physical uplink control channel (PUCCH) group among the at least two serving cells; and transmit, to the base station through the at least one transceiver, a PUCCH including hybrid automatic repeat request (HARQ)-acknowledgment (ACK) information for the unicast PDSCH or the multicast PDSCH, wherein, based on the multicast PDSCH being received from the base station in the SCell, the HARQ-ACK information is transmitted to the base station using a PUCCH resource of a primary cell (PCell) of a primary PUCCH group among the at least two serving cells, and wherein, based on the unicast PDSCH being received from the base station in the SCell, the HARQ-ACK information is transmitted to the base station using a PUCCH resource of the SCell.

9. A base station comprising:

at least one transceiver; and at least one processor coupled to the at least one transceiver, wherein the at least one processor is configured to:

transmit, to a user equipment (UE) through the at least one transceiver, configuration information related to at least two serving cells;

transmit, to the UE through the at least one transceiver, a unicast physical downlink shared channel (PDSCH) or multicast PDSCH in a secondary cell (SCell) of a secondary physical uplink control channel (PUCCH) group among the at least two serving cells; and receive, from the UE through the at least one transceiver, a PUCCH including hybrid automatic repeat request (HARQ)-acknowledgment (ACK) information for the unicast PDSCH or the multicast PDSCH, wherein, based on the multicast PDSCH being transmitted to the UE in the SCell, the HARQ-ACK information is received from the UE using a PUCCH resource of a primary cell (PCell) of a primary PUCCH group among the at least two serving cells, and wherein, based on the unicast PDSCH being transmitted to the UE in the SCell, the HARQ-ACK information is received from the UE using a PUCCH resource of the SCell.

* * * * *